United States Patent
Ferrell et al.

(10) Patent No.: US 10,871,421 B2
(45) Date of Patent: Dec. 22, 2020

(54) LOCOMOTIVE ELECTRONIC CONTROL SYSTEM TESTING DEVICE AND METHOD

(71) Applicant: Siemens Industry, Inc., Alpharetta, GA (US)

(72) Inventors: Corey J. Ferrell, Oxford, CT (US); Fabien Four, Norwalk, CT (US); Johnny Yu, Jr., Jericho, NY (US); Ankit Bhardwaj, Jersey City, NJ (US); Juan C. Velepucha, Danbury, CT (US)

(73) Assignee: Siemens Mobility, Inc., New York, NY (US)

( * ) Notice: Subject to any disclaimer, the term of this patent is extended or adjusted under 35 U.S.C. 154(b) by 246 days.

(21) Appl. No.: 15/788,135

(22) Filed: Oct. 19, 2017

(65) Prior Publication Data

US 2019/0120724 A1   Apr. 25, 2019

(51) Int. Cl.
  *G01M 17/08*  (2006.01)
(52) U.S. Cl.
  CPC .................. *G01M 17/08* (2013.01)
(58) Field of Classification Search
  CPC .................................................. G01M 17/08
  USPC ....................................................... 73/118.01
  See application file for complete search history.

(56) References Cited

U.S. PATENT DOCUMENTS

| | | | | |
|---|---|---|---|---|
| 4,041,283 A * | 8/1977 | Mosier | ............ | G09B 9/04 701/20 |
| 4,827,438 A * | 5/1989 | Nickles | ............ | G09B 9/02 246/167 R |
| 4,853,883 A * | 8/1989 | Nickles | ............ | G09B 9/04 703/8 |
| 5,292,090 A * | 3/1994 | Wetzel | ............ | B61K 9/04 105/451 |
| 6,997,418 B1 * | 2/2006 | Sanzone | ............ | B61L 3/127 246/167 R |
| 9,829,927 B2 * | 11/2017 | Kuscher | ............ | G06F 1/1662 |
| 2003/0236654 A1 * | 12/2003 | Flynn | ............ | B61C 17/12 703/8 |
| 2004/0030538 A1 * | 2/2004 | Hawthorne | ............ | G09B 9/05 703/8 |
| 2004/0093196 A1 * | 5/2004 | Hawthorne | ............ | B61L 3/125 703/8 |
| 2004/0264126 A1 * | 12/2004 | Wells | ............ | G06F 1/203 361/679.46 |
| 2005/0119804 A1 * | 6/2005 | Hawthorne | ............ | B61L 17/00 701/19 |

(Continued)

*Primary Examiner* — Eric S. McCall

(57) ABSTRACT

A locomotive simulation device may comprise a portable housing configured to be arranged in a closed position and at least one open position and a simulation system configured to generate locomotive simulation signals. A human-machine interface (HMI) may be accessible in the at least one open position and may be configured to accept at least one user input to the simulation system and present at least one output from the simulation system. At least one interface cable may be accessible in the at least one open position and may be configured to couple the simulation system to at least one external system. The simulation system may be configured to send the locomotive simulation signals to the at least one external system through the at least one interface cable and receive data from the at least one external system through the at least one interface cable.

10 Claims, 4 Drawing Sheets

(56) References Cited

U.S. PATENT DOCUMENTS

| | | | |
|---|---|---|---|
| 2007/0173989 A1* | 7/2007 | Walker | B61L 15/0081 |
| | | | 701/19 |
| 2007/0271078 A1* | 11/2007 | Flynn | G09B 9/04 |
| | | | 703/8 |
| 2008/0128318 A1* | 6/2008 | Kokinda | A45C 13/02 |
| | | | 206/701 |
| 2009/0125287 A1* | 5/2009 | Hawthorne | G09B 9/04 |
| | | | 703/8 |
| 2012/0228840 A1* | 9/2012 | Qiang | A47B 3/002 |
| | | | 280/42 |
| 2014/0126230 A1* | 5/2014 | Harris | A45C 13/30 |
| | | | 362/382 |
| 2015/0095789 A1* | 4/2015 | Hyde | G05B 19/042 |
| | | | 715/738 |
| 2017/0129512 A1* | 5/2017 | Shubs, Jr. | B61L 27/0094 |
| 2017/0197646 A1* | 7/2017 | Shubs, Jr. | B61L 27/0055 |
| 2017/0336292 A1* | 11/2017 | Gautier | B60T 17/228 |
| 2017/0344434 A1* | 11/2017 | Kung | G06F 11/1456 |
| 2017/0344507 A1* | 11/2017 | Chen | G06F 13/4282 |
| 2017/0345428 A1* | 11/2017 | Chen | G06F 1/1632 |
| 2017/0361856 A1* | 12/2017 | Fischer | B61L 27/0094 |
| 2017/0369085 A1* | 12/2017 | Sleasman | B61L 27/0055 |
| 2017/0369086 A1* | 12/2017 | Sleasman | B61L 27/0055 |
| 2018/0205615 A1* | 7/2018 | Fanara | H04L 45/02 |

* cited by examiner

LOCOMOTIVE ELECTRONIC CONTROL SYSTEM TESTING DEVICE AND METHOD

BACKGROUND

Test systems for car-borne locomotive electronic control systems are often used in the railroad industry. Traditionally, test systems for these applications occupy several large racks in laboratory facilities. Building these test systems incurs significant construction expenses and requires dedicated, fixed physical space. For railroads with multiple facilities across the country, duplicating this lab space in each facility is costly and inflexible.

According an aspect of the invention, a locomotive electronic control system testing device is provided. The locomotive electronic control system testing device comprises a portable housing configured to be arranged in a closed position and at least one open position. The locomotive electronic control system testing device further comprises a simulation system disposed in the portable housing, the simulation system comprising a controller configured to provide locomotive simulation signals to support the testing of a locomotive electronic control system that controls a locomotive. The locomotive electronic control system testing device further comprises a human-machine interface (HMI) accessible in the at least one open position. The locomotive electronic control system testing device further comprises at least one interface cable accessible in the at least one open position and configured to couple the simulation system to the locomotive electronic control system, wherein the at least one interface cable is configured to enable transmission of the locomotive simulation signals from the simulation system to the locomotive electronic control system and reception of data from the locomotive electronic control system to the simulation system.

DETAILED DESCRIPTION OF SEVERAL EMBODIMENTS

A self-contained portable test system for car-borne locomotive electronic control systems is disclosed herein. For example, the portable test system can simulate locomotive functions to support the testing of electronic control systems such as the Siemens TrainguardPTC on board unit (OBU).

Leveraging recent silicon and single board computer (SBC) developments, the self-contained portable test system design may integrate many of the functions that were realized in larger, separate systems into a compact package that occupies less space and consumes less power, and as a result is well suited for fixed and portable applications.

Figure 1:
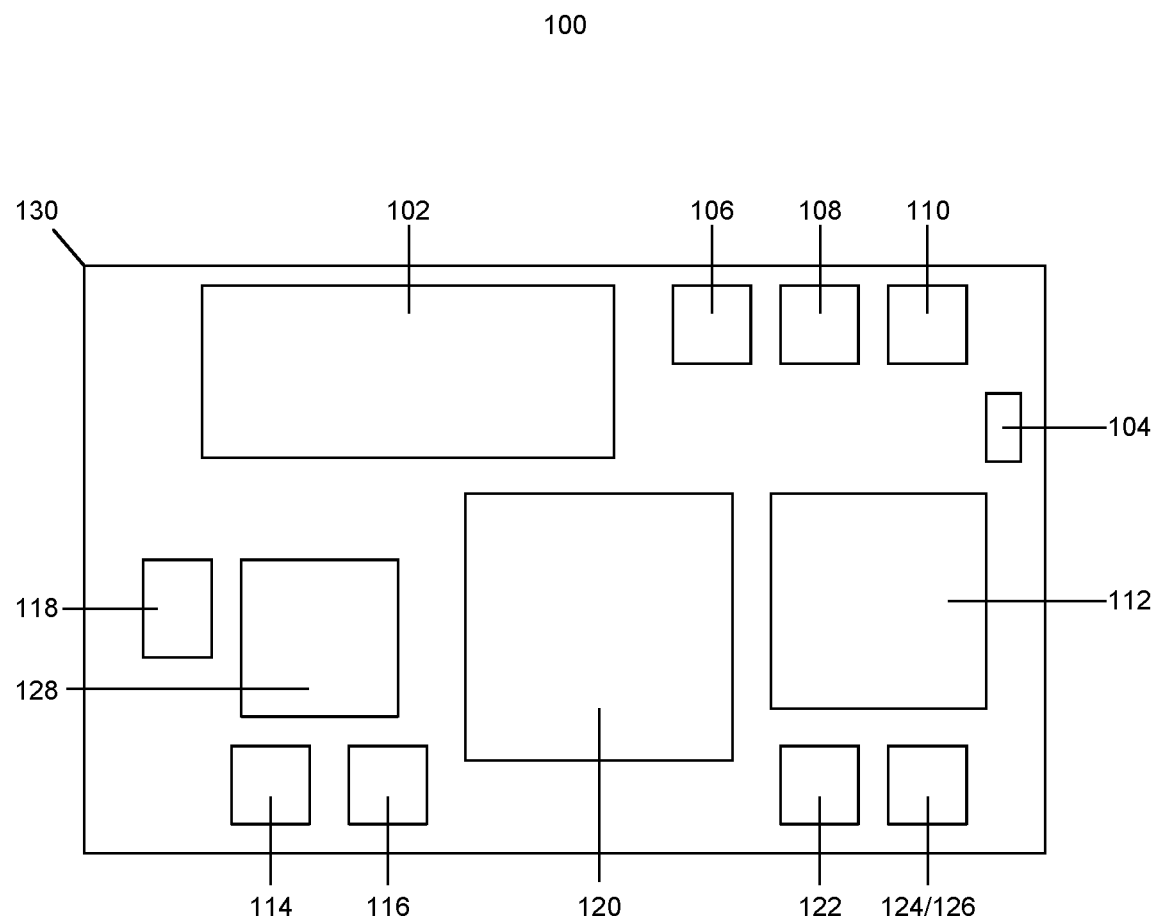
FIG. 1 is a diagram of a self-contained portable test system according to an embodiment of the invention.

FIG. 1 is a diagram of a self-contained portable test system 100 according to an embodiment of the invention. The diagram is not to scale, but it shows a relative arrangement of portable test system 100 elements within an enclosure 130 in an example embodiment.

Portable test system 100 includes a controller 120 disposed in a portable housing 200. For example, controller 120 may be a PC104 controller or other compact form factor controller. In order to provide a small system footprint, the input/output (I/O) programmable logic controller (PLC) 120 that provides the digital and analog signals to simulate the physical signals of locomotives may be optimized for space. Many I/O PLCs are large and require their own proprietary programming environment and licensing and, as a result, are expensive. Portable test system 100 may instead use one or more SBCs for controller 120. SBCs may be highly integrated platforms with a broad range of integrated I/O, both analog and digital. Using SBCs may provide flexibility in hardware and software selection which, in turn, may provide a more agile solution for the industry. SBCs may be programmed with a variety of standard tools, may support multiple operating systems, and may offer many communication options. SBCs may be available in several form factors. For example, the portable test system may use one or more SBCs based on the PC104 standard, which fit into a four inch by four inch footprint. Controller 120 may provide a graphical user interface (GUI), test engine, simulation environment, test case management, analog output signals, digital outputs, digital inputs, serial, USB, and Ethernet communications.

Portable test system 100 may include interface board 102. In some embodiments, interface board 102 may be customized to fit within a specific enclosure 130 space. Interface board 102 may comprise one or more printed circuit boards (PCBs). Interface board 102 may provide buffering, isolation, and interconnection of 3.3V SBC signals to the unit under test (UUT). For example, freight applications may require input voltages in the range of 24 to 74 VDC which cannot be directly driven with SBCs or PLCs. Interface board 102 may provide a high-density solution for level translation as well as flexibility in mapping signal types for various applications.

Interface board 102 may provide a flexible method for interconnecting UUT signals between interface board 102 and the UUT. At least one interface cable (UTT cable) is provided, which may be fixed at one end in a gland plate within enclosure 100, while the opposite ends may be fitted with mating connectors appropriate for the UUT. This "pig-tail" approach may reduce size, weight, and cost by eliminating one set of connectors on the system side. This approach may speed setup since the only connections that need to be made are at the UUT.

Portable test system 100 may include real time clock (RTC) battery 104. RTC battery 104 may connect to other elements, such as interface 102, to supply power to these elements when portable test system 100 is not connected to an external power source. Power supplied by RTC battery 104 may retain portable test system 100 settings such as system time, date, BIOS configuration, etc. while portable test system 100 is disconnected from external power. RTC battery 104 may be rechargeable and may recharge when portable test system 100 is connected to an external power source.

Portable test system 100 may include one or more external ports allowing portable test system 100 to connect to other systems and/or peripherals. For example, portable test system 100 may include rear USB ports 106, rear Ethernet ports 108, serial ports 110, front Ethernet ports 122, front USB ports 124, and/or VGA port 126. As the UUT may contain various types of communications interfaces, portable test system 100 may contain interfaces of various types in order to send simulation data to and receive response data from the UUT as well as any subsystems, such as quadrature generator 118. Front and rear Ethernet ports 122 and 108 may provide multiple isolated network connections to facilitate segmented test, control, and monitoring traffic as may be utilized by the application. Front USB ports 124 and front VGA port 126 may be used for a console keyboard-video-mouse (KVM) connection to controller 120, for example.

Portable test system 100 may include a 5V DC-DC converter 112. The UUT may operate on various DC voltage levels incompatible with the input power requirements of the controller 120. To mitigate this, portable test system 100 may include power supplies or DC-DC converters (e.g., DC-DC converter 112) to provide the specified input for controller 120 while maintaining flexibility for the voltage used to power the UUT and any associated I/O.

Portable test system 100 may include a main power switch 114. Power switch 114 may activate an AC power relay located within housing 200. This relay may provide an air-gap disconnect for the AC and DC loads within housing 200.

Portable test system 100 may include an AC circuit breaker 116. Since portable test system 100 may be fully self-sufficient and may be used for testing, demonstration, and educational purposes, AC circuit breaker 116 may provide overcurrent protection for the fully-configured setup, including protection for peripheral components deriving power from its AC or DC distribution points.

Portable test system 100 may include a speed sensor simulator 118 (e.g., a quadrature generator, single probe velocity simulator, dual-frequency analog simulator, etc.). For example, portable test system 100 may provide wheel tachometer simulation. This may be a time-critical component in that it may provide a real-time representation of the rotational velocity of a locomotive wheel. This representation may include specific programmed acceleration and deceleration curves as well as constant velocity to a set maximum (e.g., 100 mph for some embodiments, although other speeds may be possible for other applications), forward and reverse, for example. Portable test system 100 may be configured so that the simulation signal is not impacted by other operating system functions, interrupts, etc. In some embodiments, this isolation may be achieved using a separate SBC (e.g., Arduino) or other quadrature generator as speed sensor simulator 118. The quadrature generator may produce a two-channel quadrature output which may be buffered on interface board 102 to be compatible with standard digital speed probe inputs. Speed sensor simulator 118 may receive commands from a controller SBC (e.g., controller 120) over a USB interface. Some embodiments may omit the quadrature SBC, integrating this function into an FPGA, ASIC, or other MCU on the controller SBC, thereby reducing size, weight, and cost further.

Portable test system 100 may include a mass storage device 128, such as a SATA, mSATA, or SATADOM solid state drive. The mass storage device 128 may contain the operating system, applications, test scenarios, device drivers, test and analysis reports, and test logs used and created by the functions of the portable test system 100, for example.

Figure 2A:
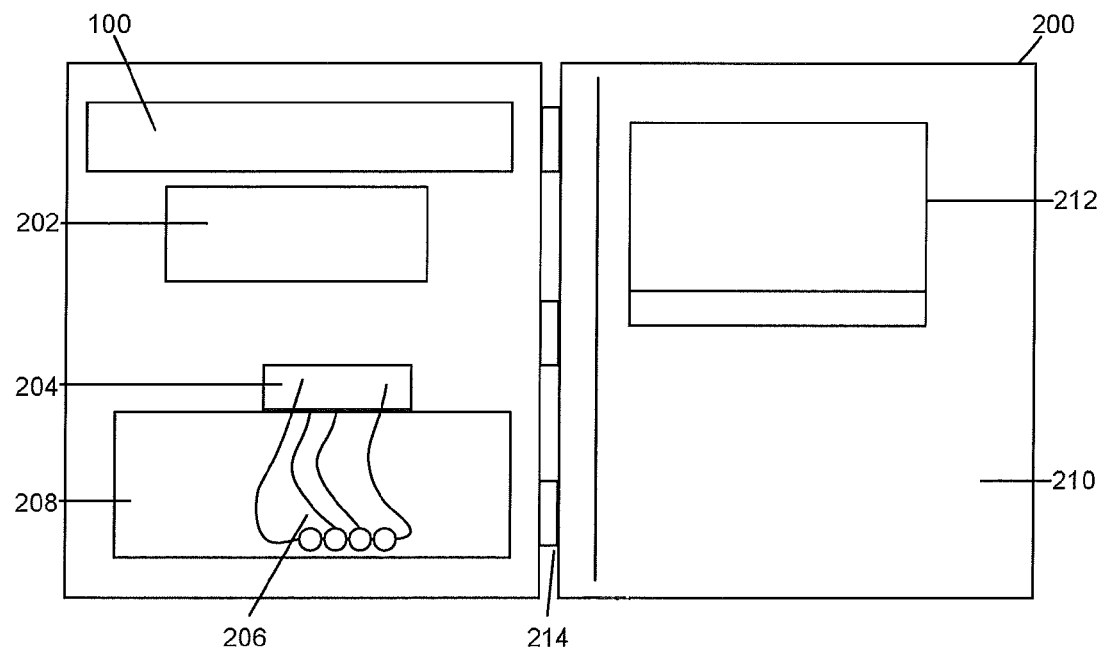
FIGS. 2A-2B are diagrams of a self-contained portable test system housing according to an embodiment of the invention.
Figure 2B:
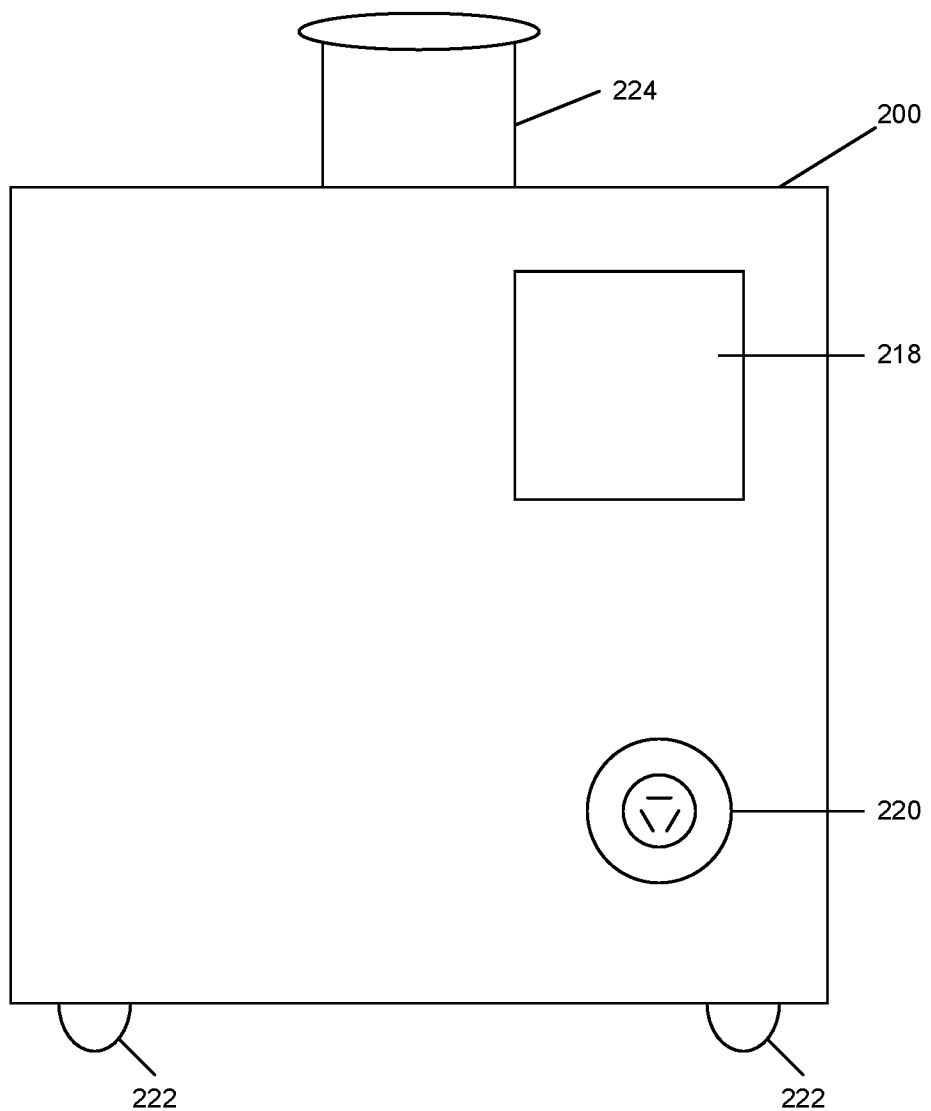

FIGS. 2A-2B are diagrams of a self-contained portable test system housing 200 according to an embodiment of the invention. Portable test system 100 maybe disposed within housing 200.

In some embodiments, housing 200 may be a road case (e.g., a portable case that may be similar to what many performing artists use for live events). Housing 200 may include integrated wheels 222 and/or handle 224 (e.g., a retractable handle), making it a completely portable system.

Housing 200 may include cooling fan 218 for cooling electrical components within housing 200 (e.g., components such as those described below). Housing 200 may include power inlet 220 (e.g., AC power inlet configured to connect to an AC power source such as a 110 or 220 V outlet through a detachable power cord) for powering electrical components within housing 200. Housing 200 may be configured to be arranged in an open position (e.g., as shown in FIG. 2A) or a closed position (e.g., as shown in FIG. 2B) and may be latched closed for transport.

When housing 200 is in the open position, several components may be accessible. In particular, the housing 200 houses a human-machine interface (HMI) 212 that may be installed on a hinged and/or removable HMI panel 210. HMI 212 may be configured to provide positive train control (PTC) and/or other train control application interfaces. Once at the desired location, housing 200 may be placed into position, the latches may be released, and the lid may be swung open to an appropriate viewing angle for HMI 212. For added flexibility, panel 210 may be lifted off its hinges and separated for testing in highway-rail (HiRail) vehicles or other applications that may benefit from alternate viewing positions for HMI 212.

Other components that may be accessible when housing 200 is open may include portable test system 100, managed network switch 202, cable gland 204 and UUT cables 206, and cable storage area 208. UUT cables 206 may be unfurled from cable storage area 208 and connected. A console (e.g., a keyboard, video, mouse (KVM)) may be connected directly to portable test system 100 front panel, or a remote connection may be established using managed network switch 202 (e.g., using Ethernet). A twist-lock power cable may be removed from cable storage area 208 and mated to power inlet 220. The power cable may be plugged into the selected site power source, and portable test system 100 may be ready to run. These integrated features make the system fully self-contained. For added convenience, a high current USB charger and 15 A 120V receptacle may be fitted to cable gland 204 panel, providing support for auxiliary devices on-site, at trade shows, or any environment remote from lab facilities.

Figure 3:
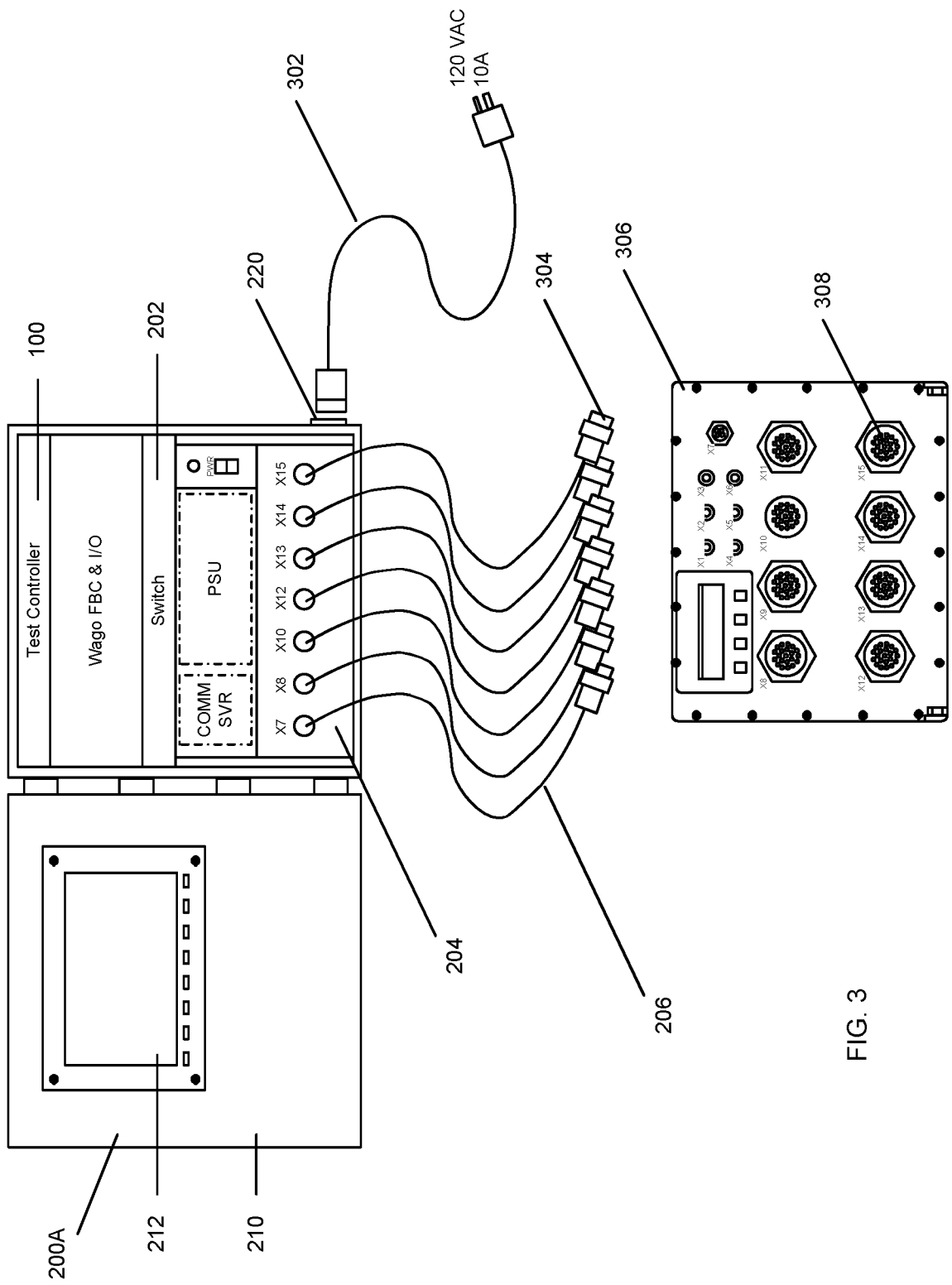
FIG. 3 is a diagram of a self-contained portable test system housing and cables according to an embodiment of the invention.

FIG. 3 is a diagram of a self-contained portable test system housing 200A and cables according to an embodiment of the invention. This figure illustrates an alternative arrangement for the housing (e.g., with panels reversed so that managed network switch 202, cable gland 204 and UUT cables 206 are on the right and HMI 212 is on the left). FIG. 3 also shows some components in detail, such as twist-lock power cable 302 that may be mated to power inlet 220 as referenced above. FIG. 3 shows UUT cables 206 with mating connectors 304. As noted above, mating connectors 304 may be configured to interface with a UUT. FIG. 3 also shows a panel 306 of a UUT, which includes plugs 308. Mating connectors 304 may be configured to mate with plugs 308.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A locomotive electronic control system testing device comprising:
   a portable housing configured to be arranged in a closed position and at least one open position;
   a simulation system disposed in the portable housing, the simulation system comprising a controller configured to provide locomotive simulation signals to support the testing of a locomotive electronic control system that controls a locomotive;
   a human-machine interface (HMI) accessible in the at least one open position;
   at least one interface cable accessible in the at least one open position and configured to couple the simulation system to the locomotive electronic control system, wherein the at least one interface cable is configured to enable transmission of the locomotive simulation signals from the simulation system to the locomotive electronic control system and reception of data from the locomotive electronic control system to the simulation system; and
   a network switch, wherein the simulation system is configured to send the locomotive simulation signals to the locomotive electronic control system through the network switch and receive data from the locomotive electronic control system through the network switch.

2. The locomotive electronic control system testing device of claim 1, further comprising a power inlet configured to couple the simulation system to a power source through a cable.

3. The locomotive electronic control system testing device of claim 1, further comprising a cable storage area accessible in the at least one open position and configured to house the at least one interface cable.

4. The locomotive electronic control system testing device of claim 1, further comprising a cooling fan disposed in the portable housing and configured to cool the simulation system.

5. The locomotive electronic control system testing device of claim 1, further comprising a removable HMI panel in which the HMI is disposed.

6. The locomotive electronic control system testing device of claim 1, further comprising at least one wheel coupled to the portable housing.

7. The locomotive electronic control system testing device of claim 1, further comprising at least one handle coupled to the portable housing.

8. The locomotive electronic control system testing device of claim 1, wherein the simulation system comprises at least one of an interface board, a battery, an external port, a DC-DC converter, a main power switch, an AC circuit breaker, a quadrature generator, and a mass storage device.

9. A locomotive electronic control system testing device comprising:
   a portable housing configured to be arranged in a closed position and at least one open position;
   a simulation system disposed in the portable housing, the simulation system comprising a controller configured to provide locomotive simulation signals to support the testing of a locomotive electronic control system that controls a locomotive;
   a human-machine interface (HMI) accessible in the at least one open position;
   at least one interface cable accessible in the at least one open position and configured to couple the simulation system to the locomotive electronic control system, wherein the at least one interface cable is configured to enable transmission of the locomotive simulation signals from the simulation system to the locomotive electronic control system and reception of data from the locomotive electronic control system to the simulation system, wherein the controller comprises a single board computer (SBC).

10. A locomotive electronic control system testing device comprising:
    a portable housing configured to be arranged in a closed position and at least one open position;
    a simulation system disposed in the portable housing, the simulation system comprising a controller configured to provide locomotive simulation signals to support the testing of a locomotive electronic control system that controls a locomotive;
    a human-machine interface (HMI) accessible in the at least one open position; and
    at least one interface cable accessible in the at least one open position and configured to couple the simulation system to the locomotive electronic control system, wherein the at least one interface cable is configured to enable transmission of the locomotive simulation signals from the simulation system to the locomotive electronic control system and reception of data from the locomotive electronic control system to the simulation system;
    a cable storage area accessible in the at least one open position and configured to house the at least one interface cable,
    wherein the at least one interface cable comprises a plurality of interface cables, each interface cable being fixed at one end to a cable gland panel located within the portable housing and fitted at the other end with a mating connector configured to be coupled to the locomotive electronic control system.

* * * * *